(12) United States Patent
Ding et al.

(10) Patent No.: US 12,335,778 B2
(45) Date of Patent: Jun. 17, 2025

(54) DATA RECEIVING METHOD, DATA SENDING METHOD, AND RELATED DEVICE

(71) Applicant: Huawei Technologies Co., Ltd., Shenzhen (CN)

(72) Inventors: Xu Ding, Nanjing (CN); Li Zhang, Wuhan (CN); Sheng Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 394 days.

(21) Appl. No.: 17/807,029

(22) Filed: Jun. 15, 2022

(65) Prior Publication Data
US 2022/0312264 A1     Sep. 29, 2022

Related U.S. Application Data

(63) Continuation of application No. PCT/CN2020/115748, filed on Sep. 17, 2020.

(30) Foreign Application Priority Data

Dec. 16, 2019    (CN) .......................... 201911295975.0

(51) Int. Cl.
     *H04L 12/54*          (2022.01)
     *H04L 1/00*            (2006.01)
     (Continued)

(52) U.S. Cl.
     CPC ........... *H04W 28/06* (2013.01); *H04L 1/0068* (2013.01); *H04W 84/12* (2013.01)

(58) Field of Classification Search
     CPC ....... H04B 1/16; H04L 1/0045; H04L 1/0061; H04L 1/0068; H04L 1/04; H04W 28/06; H04W 84/12
See application file for complete search history.

(56) References Cited

U.S. PATENT DOCUMENTS 6,208,669 B1    3/2001   Cimini, Jr. et al.
2005/0002421 A1*   1/2005   Ito .......................... H04L 1/1809
                                                           370/428

(Continued)

FOREIGN PATENT DOCUMENTS

CN          1938962 A   *   3/2007   ............. H04L 25/14
CN       101325468 A      12/2008
(Continued)

OTHER PUBLICATIONS

Reddy, S. et al.,"Performance comparison of Autocorrelation and CORDIC algorithm implemented on FPGA for OFDM based WLAN", International Conference on Communication Software and Networks, Feb. 27-28, 2009, 5 pages.
Zhang, W.,"Research on Modeling and Resource Allocation in OFDM System Based on Cognitive Radio", Hebei Engineering University, Issue 03, with an English abstract, May 26, 2014, 73 pages.

*Primary Examiner* — Phuc H Tran
(74) *Attorney, Agent, or Firm* — Slater Matsil, LLP

(57) ABSTRACT

A data receiving method is disclosed. The method includes: A wireless local area network (WLAN) receiving device receives, by using a first frequency module through a first channel, first data that is sent by a WLAN sending device. The WLAN receiving device receives, by using a second radio frequency module through a second channel, second data that is sent by the WLAN sending device. The WLAN receiving device obtains a received information field based on an information field of the first data and/or an information field of the second data. The WLAN receiving device obtains a received check field based on a check field of the first data and/or a check field of the second data. The WLAN receiving device attempts to check the received information field by using the received check field to obtain an original information field.

20 Claims, 7 Drawing Sheets

(51) Int. Cl.
*H04W 28/06* (2009.01)
*H04W 84/12* (2009.01)

(56) References Cited

U.S. PATENT DOCUMENTS

| | | | |
|---|---|---|---|
| 2007/0206529 A1* | 9/2007 | Liu | H04L 1/1893 370/328 |
| 2009/0249133 A1* | 10/2009 | Pons | H04L 1/1835 714/751 |
| 2013/0336335 A1 | 12/2013 | Hassan et al. | |
| 2014/0118151 A1 | 5/2014 | Depoy | |
| 2014/0219663 A1* | 8/2014 | Roberts | H04B 10/524 398/185 |
| 2018/0227889 A1 | 8/2018 | Yang | |
| 2019/0335416 A1 | 10/2019 | Kumar et al. | |
| 2020/0169955 A1* | 5/2020 | Chang | H04L 5/001 |

FOREIGN PATENT DOCUMENTS

| | | |
|---|---|---|
| CN | 103430503 A | 12/2013 |
| CN | 107465489 A | 12/2017 |
| CN | 107733551 A | 2/2018 |
| CN | 108111194 A | 6/2018 |
| CN | 108430055 A | 8/2018 |
| CN | 109168149 A | 1/2019 |
| EP | 3203668 A1 | 8/2017 |
| WO | 2005015848 A1 | 2/2005 |
| WO | 2015127658 A1 | 9/2015 |
| WO | 2017105038 A1 | 6/2017 |
| WO | 2017211219 A1 | 12/2017 |
| WO | 2019071592 A1 | 4/2019 |

\* cited by examiner

DATA RECEIVING METHOD, DATA SENDING METHOD, AND RELATED DEVICE

CROSS-REFERENCE TO RELATED APPLICATIONS

This application is a continuation of International Application No. PCT/CN2020/115748, filed on Sep. 17, 2020, which claims priority to Chinese Patent Application No. 201911295975.0, filed on Dec. 16, 2019. The disclosures of the aforementioned applications are hereby incorporated by reference in their entireties.

TECHNICAL FIELD

This application relates to the field of data processing, and in particular, to a data receiving method, a data sending method, and a related device.

BACKGROUND

During data transmission, because noise interference may exist, a bit error may occur in data. As a result, transmitted data is unreliable.

To resolve a problem that the transmitted data is unreliable, an additional error-correcting code may be added to original information. Adding the additional error-correcting code to the original information is a channel coding technology. The channel coding technology means that before original data is transmitted, a WLAN sending device encodes the original information to obtain the original data, where the original data includes an original information field and an original check field. After receiving the original data, a receiving device checks the received original information field based on the original check field. If an error is found, that is, a bit error is found, the receiving device performs error correction.

If the bit error in the original data is beyond the capability of decoding error correction, transmission of the original data may fail. If the original data is transmitted through a plurality of channels, how to ensure reliability of the transmitted data is an urgent problem to be resolved.

SUMMARY

This application provides a data receiving method, a data sending method, and a related device, to improve data transmission reliability.

A first aspect of this application provides a data receiving method, including:

A WLAN receiving device establishes a communication connection to a WLAN sending device through a first channel and a second channel. The WLAN receiving device may receive, by using a first radio frequency module through the first channel, first data that is sent by the WLAN sending device, where the first data is all or a part of original data, the original data includes an original information field and an original check field, the original check field is a result of checking the original information field, and the first channel belongs to a wireless local area network (WLAN) channel. The WLAN receiving device may further receive, by using a second radio frequency module through the second channel, second data that is sent by the WLAN sending device, where the second data is all or a part of the original data, the second channel belongs to the WLAN channel, a frequency of the second channel is different from a frequency of the first channel, the second radio frequency module is different from the first radio frequency module, and content of the second data is different from content of the first data. After the WLAN receiving device receives the first data and the second data, the WLAN receiving device may obtain a received information field based on an information field of the first data and/or an information field of the second data; the WLAN receiving device may obtain a received check field based on a check field of the first data and/or a check field of the second data; and the WLAN receiving device attempts to check the received information field by using the received check field to obtain the original information field.

In this application, the first channel and the second channel are independent of each other. Therefore, errors that may occur in the data in the two channels are usually irrelevant. However, the data transmitted in the first channel and the second channel is from the same original data. The WLAN receiving device fixes a possible error by using an association between the first data transmitted in the first channel and the second data transmitted in the second channel, which improves data transmission reliability.

In a possible design, in a first implementation of the first aspect of this application, the first data includes a first information field and a first check field, the second data includes a second information field and a second check field, and a length ratio of the first information field to the first check field is equal to a length ratio of the second information field to the second check field.

In a possible design, in a second implementation of the first aspect of this application, the first data includes a first information field and a first check field, the second data includes a second information field and a second check field, and content of the first information field is the same as content of the second information field. Because it is simpler to determine whether two information fields are the same than perform a combination algorithm of the two information fields, when the two information fields are correctly transmitted, a workload of the WLAN receiving device can be reduced.

In a possible design, in a third implementation of the first aspect of this application, the first data includes a first information field and a first check field, the second data includes a second information field and a second check field, and content of the first check field is the same as content of the second check field. Because it is simpler to determine whether the two check fields are the same than perform a combination algorithm of the two check fields, when the two check fields are correctly transmitted, a workload of the WLAN receiving device can be reduced.

In a possible design, in a fourth implementation of the first aspect of this application, the first data includes a first information field and a first check field. The second data includes only a second check field. The WLAN receiving device obtains the received information field based on the first information field. The WLAN receiving device obtains the received check field based on the first check field and the second check field. The first information field is used as the received information field, and information field combination does not need to be performed, so that a workload of the WLAN receiving device can be reduced.

In a possible design, in a fifth implementation of the first aspect of this application, the first data includes a first information field and a first check field, and the second data includes only a second information field. The WLAN receiving device obtains the received information field based on the first information field and the second information field. The WLAN receiving device obtains the received check field based on the first check field. The first check field is used as the received check field, and check field combination does not need to be performed, so that a workload of the WLAN receiving device can be reduced.

In a possible design, in a sixth implementation of the first aspect of this application, the WLAN receiving device obtains the received information field and the received check field from the first data and the second data through equal gain combination or maximum ratio combination.

In a possible design, in a seventh implementation of the first aspect of this application, the first data includes a first information field and a first check field. The second data includes a second information field and a second check field. Content of the first information field is different from content of the second information field. Content of the first check field is different from content of the second check field. A length ratio of the first information field to the first check field is different from a length ratio of the second information field to the second check field.

A second aspect of this application provides a data sending method, including:

A WLAN sending device establishes a communication connection to a WLAN receiving device through a first channel and a second channel. The WLAN sending device processes original data to obtain first data and second data, where the original data includes an original information field and an original check field, the original check field is a result of checking the original information field, the first data is the original data or a part of the original data, the second data is the original data or a part of the original data, and the first data is different from the second data. The WLAN sending device may send the first data to the WLAN receiving device by using a first radio frequency module through the first channel, where the first channel belongs to a WLAN channel. The WLAN sending device may send, by using a second radio frequency module through the second channel, the second data to the WLAN receiving device, where the second channel belongs to the WLAN channel, a frequency of the second channel is different from a frequency of the first channel, and the second radio frequency module is different from the first radio frequency module.

In this application, the first channel and the second channel are independent of each other. Therefore, errors that may occur in the data in the two channels are usually irrelevant. However, the data transmitted in the first channel and the second channel is from the same original data. The WLAN sending device uses an association between the first data transmitted in the first channel and the second data transmitted in the second channel, to improve data transmission reliability.

In a possible design, in a first implementation of the second aspect of this application, the first data includes a first information field and a first check field, the second data includes a second information field and a second check field, and a length ratio of the first information field to the first check field is equal to a length ratio of the second information field to the second check field.

In a possible design, in a second implementation of the second aspect of this application, the first data includes a first information field and a first check field, the second data includes a second information field and a second check field, and content of the first information field is the same as content of the second information field. Because it is simpler to determine whether two information fields are the same than perform a combination algorithm of the two information fields, when the two information fields are correctly transmitted, a workload of the WLAN receiving device can be reduced.

In a possible design, in a third implementation of the second aspect of this application, the first data includes a first information field and a first check field, the second data includes a second information field and a second check field, and content of the first check field is the same as content of the second check field. Because it is simpler to determine whether the two check fields are the same than perform a combination algorithm of the two check fields, when the two check fields are correctly transmitted, a workload of the WLAN receiving device can be reduced.

In a possible design, in a fourth implementation of the second aspect of this application, the first data includes a first information field and a first check field. The second data includes only a second check field. The WLAN receiving device obtains a received information field based on the first information field. The WLAN receiving device obtains a received check field based on the first check field and the second check field. The first information field is used as the received information field, and information field combination does not need to be performed, so that a workload of the WLAN receiving device can be reduced.

In a possible design, in a fifth implementation of the second aspect of this application, the first data includes a first information field and a first check field. The second data includes only a second information field. The WLAN receiving device obtains a received information field based on the first information field and the second information field. The WLAN receiving device obtains a received check field based on the first check field. The first check field is used as the received check field, and check field combination does not need to be performed, so that a workload of the WLAN receiving device can be reduced.

In a possible design, in a sixth implementation of the second aspect of this application, the first data includes a first information field and a first check field. The second data includes a second information field and a second check field. Content of the first information field is different from content of the second information field. Content of the first check field is different from content of the second check field. A length ratio of the first information field to the first check field is not equal to a length ratio of the second information field to the second check field.

In a possible design, in a seventh implementation of the second aspect of this application, a rate at which the WLAN sending device sends the first data is different from a rate at which the WLAN sending device sends the second data. Start time at which the WLAN sending device sends the first data is the same as start time at which the WLAN sending device sends the second data. End time at which the WLAN sending device sends the first data is the same as end time at which the WLAN sending device sends the second data. Because the transmission rate of the first channel may be different from the transmission rate of the second channel, data amounts of the first data and the second data may be adjusted, so that the transmission start time and the transmission end time of the first data are the same as those of the second data, to ensure that transmission delays of the first data and the second data are the same.

A third aspect of this application provides a WLAN receiving apparatus, including: a first receiving unit, configured to receive, by using a first radio frequency module through a first channel, first data that is sent by a WLAN sending device, where the first data is all or a part of original data, the original data includes an original information field and an original check field, the original check field is a result of checking the original information field, and the first channel belongs to a WLAN channel; a second receiving unit, configured to receive, by using a second radio frequency module through a second channel, second data that is sent by the WLAN sending device, where the second data is all or a part of the original data, the second channel belongs to the WLAN channel, a frequency of the second channel is different from a frequency of the first channel, the second radio frequency module is different from the first radio frequency module, and content of the second data is different from content of the first data; a first processing unit, configured to obtain a received information field based on an information field of the first data and/or an information field of the second data; a second processing unit, configured to obtain a received check field based on a check field of the first data and/or a check field of the second data; and a third processing unit, configured to attempt to check the received information field by using the received check field to obtain the original information field.

In a possible design, in a first implementation of the third aspect of this application, the first data includes a first information field and a first check field. The second data includes a second information field and a second check field. Content of the first check field is the same as content of the second check field.

In a possible design, in a second implementation of the third aspect of this application, the first data includes a first information field and a first check field. The second data includes a second information field and a second check field. A length ratio of the first information field to the first check field is equal to a length ratio of the second information field to the second check field.

In a possible design, in a third implementation of the third aspect of this application, the first data includes a first information field and a first check field. The second data includes a second information field and a second check field. Content of the first information field is the same as content of the second information field.

In a possible design, in a fourth implementation of the third aspect of this application, the first data includes a first information field and a first check field. The second data includes only a second check field. The received information field is the first information field.

In a possible design, in a fifth implementation of the third aspect of this application, the first data includes a first information field and a first check field. The second data includes only a second information field. The received check field is the first check field.

In a possible design, in a sixth implementation of the third aspect of this application, the processing unit is specifically configured to obtain the received information field and the received check field from the first data and the second data through equal gain combination or maximum ratio combination.

In a possible design, in a seventh implementation of the third aspect of this application, the first data includes a first information field and a first check field. The second data includes a second information field and a second check field. Content of the first information field is different from content of the second information field. Content of the first check field is different from content of the second check field. A length ratio of the first information field to the first check field is not equal to a length ratio of the second information field to the second check field.

A fourth aspect of this application provides a WLAN sending apparatus, including: a processing unit, configured to process original data, so as to obtain first data and second data, where the original data includes an original information field and an original check field, the original check field is a result of checking the original information field, and the first data or the second data includes an information field; a first sending unit, configured to send the first data to a WLAN receiving device by using a first radio frequency module through a first channel, where the first channel belongs to a WLAN channel; and a second sending unit, configured to send the second data to the WLAN receiving device by using a second radio frequency module through a second channel, where the second channel belongs to the WLAN channel, a frequency of the second channel is different from a frequency of the first channel, the second radio frequency module is different from the first radio frequency module, content of the second data is different from content of the first data, the second data and the first data are used by the WLAN receiving device to obtain a received information field and a received check field, and the WLAN receiving device attempts to check the received information field by using the received check field to obtain the original information field.

In a possible design, in a first implementation of the fourth aspect of this application, the first data includes a first information field and a first check field. The second data includes a second information field and a second check field. Content of the first check field is the same as content of the second check field.

In a possible design, in a second implementation of the fourth aspect of this application, the first data includes a first information field and a first check field. The second data includes a second information field and a second check field. A length ratio of the first information field to the first check field is equal to a length ratio of the second information field to the second check field.

In a possible design, in a third implementation of the fourth aspect of this application, the first data includes a first information field and a first check field. The second data includes a second information field and a second check field. Content of the first information field is the same as content of the second information field.

In a possible design, in a fourth implementation of the fourth aspect of this application, the first data includes a first information field and a first check field. The second data includes only a second check field.

In a possible design, in a fifth implementation of the fourth aspect of this application, the first data includes a first information field and a first check field. The second data includes only a second information field.

In a possible design, in a sixth implementation of the fourth aspect of this application, a rate at which the WLAN sending device sends the first data is different from a rate at which the WLAN sending device sends the second data. Start time at which the WLAN sending device sends the first data is the same as start time at which the WLAN sending device sends the second data. End time at which the WLAN sending device sends the first data is the same as end time at which the WLAN sending device sends the second data.

In a possible design, in a seventh implementation of the fourth aspect of this application, the first data includes a first information field and a first check field. The second data includes a second information field and a second check field. Content of the first information field is different from content of the second information field. Content of the first check field is different from content of the second check field. A length ratio of the first information field to the first check field is not equal to a length ratio of the second information field to the second check field.

A fifth aspect of this application provides a WLAN receiving device, including: a first radio frequency module, a second radio frequency module, and a processor.

The first radio frequency module is configured to receive, through a first channel, first data that is sent by a WLAN sending device, where the first data is all or a part of original data, the original data includes an original information field and an original check field, the original check field is a result of checking the original information field, and the first channel belongs to a WLAN channel.

The second radio frequency module is configured to receive, through a second channel, second data that is sent by the WLAN sending device, where the second data is all or a part of the original data, the second channel belongs to the WLAN channel, a frequency of the second channel is different from a frequency of the first channel, the second radio frequency module is different from the first radio frequency module, and the second data is different from the first data.

The processor is configured to obtain a received information field based on an information field of the first data and/or an information field of the second data.

The processor is further configured to obtain a received check field based on a check field of the first data and/or a check field of the second data.

The processor is further configured to attempt to check the received information field by using the received check field to obtain the original information field.

A sixth aspect of this application provides a WLAN sending device, including: a first radio frequency module, a second radio frequency module, and a processor.

The processor is configured to process original data, so as to obtain first data and second data, where the original data includes an original information field and an original check field, the original check field is a result of checking the original information field, the first data is the original data or a part of the original data, the second data is the original data or a part of the original data, and the first data is different from the second data.

The first radio frequency module is configured to send the first data to a WLAN receiving device through a first channel, where the first channel belongs to a WLAN channel.

The second radio frequency module is configured to send, through a second channel, the second data to the WLAN receiving device, where the second channel belongs to the WLAN channel, a frequency of the second channel is different from a frequency of the first channel, and the second radio frequency module is different from the first radio frequency module.

A seventh aspect of this application provides a computer storage medium, where the computer storage medium stores instructions. When the instructions are executed on a computer, the computer is enabled to perform the method according to any one of the first aspect or the implementations of the first aspect; or perform the method according to any one of the second aspect or the implementations of the second aspect.

An eighth aspect of this application provides a computer program product. When the computer program product is run on a computer, the computer is enabled to perform the method according to any one of the first aspect or the implementations of the first aspect; or perform the method according to any one of the second aspect or the implementations of the second aspect.

DETAILED DESCRIPTION OF ILLUSTRATIVE EMBODIMENTS

Figure 1:
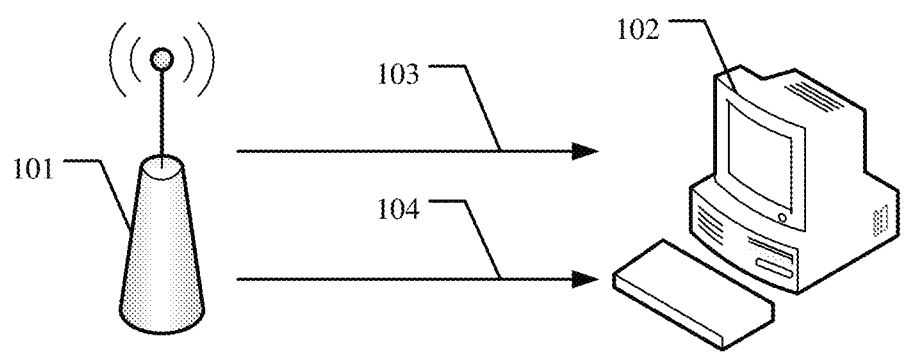
FIG. 1 is a schematic diagram of a network framework according to an embodiment of this application.

Embodiments of this application provide a data receiving method, a data sending method, and a related device, which are applied to the data processing field, to improve data transmission reliability in multi-channel data transmission.

To better understand a data transmission method in embodiments of this application, the following describes an application scenario of embodiments of this application.

Channel coding: During data transmission, a bit error occurs in a transmitted data stream due to various kinds of interference. As a result, jumping, discontinuity, and mosaics occur at a receive end. Through channel coding, original information is processed accordingly to obtain original data. The original data includes an information field and a check field. Because of the check field, the original data has a capability of error correction and anti-interference, which can greatly avoid the occurrence of the bit error in transmission of a data stream and improve data transmission efficiency. Reducing a rate of bit error is a task of channel coding. The essence of channel coding is to increase communication reliability, but channel coding reduces data transmission of useful information. In a process of channel coding, some symbols are added to the original information, that is, a check field is generated. In a channel with fixed bandwidth, a total transmission bit rate is fixed. Because the check field is added in channel coding, that is, an amount of data is increased, a transmission bit rate of the useful information is reduced. Coding efficiency is obtained by dividing the information field by a total number of bits. When different coding schemes are used, the coding efficiency is different. Generally, a higher ratio of the check field in channel coding indicates lower coding efficiency, and a lower ratio of the check field in channel coding indicates higher coding efficiency.

Puncturing: The essence of puncturing is to reduce an amount of data to be transmitted. For example, the original data includes a total of nine bits: A1, A2, A3, B1, B2, B3, C1, C2, and C3. A WLAN sending device may delete some data from the original data by puncturing. For example, locations of puncturing by the WLAN sending device correspond to A1, B2, and C3. In this case, data sent by the WLAN sending device to a WLAN receiving device does not include A1, B2, or C3, and includes only six bits: A2, A3, B1, B3, C1, and C2. Usually, the WLAN sending device has a puncturing table or a puncturing algorithm, which is used to indicate locations in the original data to be punctured by the WLAN sending device.

The channel coding technology is often used with puncturing, to extract a bit sequence of a predetermined length from a bit stream of the original data. This process is called rate matching. Research shows that an even and symmetrical puncturing pattern can achieve the best rate matching performance. Even puncturing means that bit locations for puncturing are evenly distributed, to avoid puncturing of bits in consecutive bit locations.

The foregoing describes the application scenario, and the following describes a network framework in embodiments of this application.

Refer to FIG. 1. The network framework in an embodiment of this application includes: a WLAN sending device 101, a WLAN receiving device 102, a first channel 103, and a second channel 104.

The WLAN sending device 101 establishes a communication connection to the WLAN receiving device 102 through the first channel 103 and the second channel 104. The WLAN sending device 101 may send data to the WLAN receiving device 102 through the first channel 103 or the second channel 104. The WLAN receiving device 102 may receive, through the first channel 103 or the second channel 104, the data sent by the WLAN sending device 101.

The first channel 103 and the second channel 104 are WLAN channels, where the WLAN channel is a data signal transmission channel that uses a wireless signal as a transmission medium, and the first channel 103 and the second channel 104 are different channels. For example, commonly used IEEE802.11b/g works in a frequency band of 2.401 to 2.483 GHz. The frequency band is divided into 13 channels. The first channel 103 may be a channel 1, and the second channel 104 may be a channel ii, provided that the first channel 103 and the second channel 104 belong to different channels. For example, the first channel 103 is a channel 1, a center frequency of the first channel is 2412 MHz, and a frequency range of the first channel is 2401 to 2423 MHz. The second channel 104 is a channel 6, a center frequency of the channel 6 is 2437 MHz, and a frequency range of the channel 6 is 2426 to 2448 MHz.

The first channel 103 and the second channel 104 may belong to different frequency bands. For example, the first channel 103 belongs to a 2.4 GHz frequency band, and the second channel belongs to a 5 GHz frequency band.

In actual application, there may be more channels between the WLAN sending device 101 and the WLAN receiving device 102 in addition to the first channel 103 and the second channel 104.

The WLAN sending device 101 and the WLAN receiving device 102 may be computers, or may be mobile phones, tablets, switches, wireless access points, or the like.

The foregoing describes the network framework in embodiments of this application, and the following describes a data transmission method in embodiments of this application.

In the data transmission method in embodiments of this application, both first data and second data may include an information field and a check field, or the first data includes a first information field and a first check field, and the second data includes only a second information field or a second check field. The following describes the two cases respectively.

1. The first data and the second data include the information field and the check field.

Figure 2:
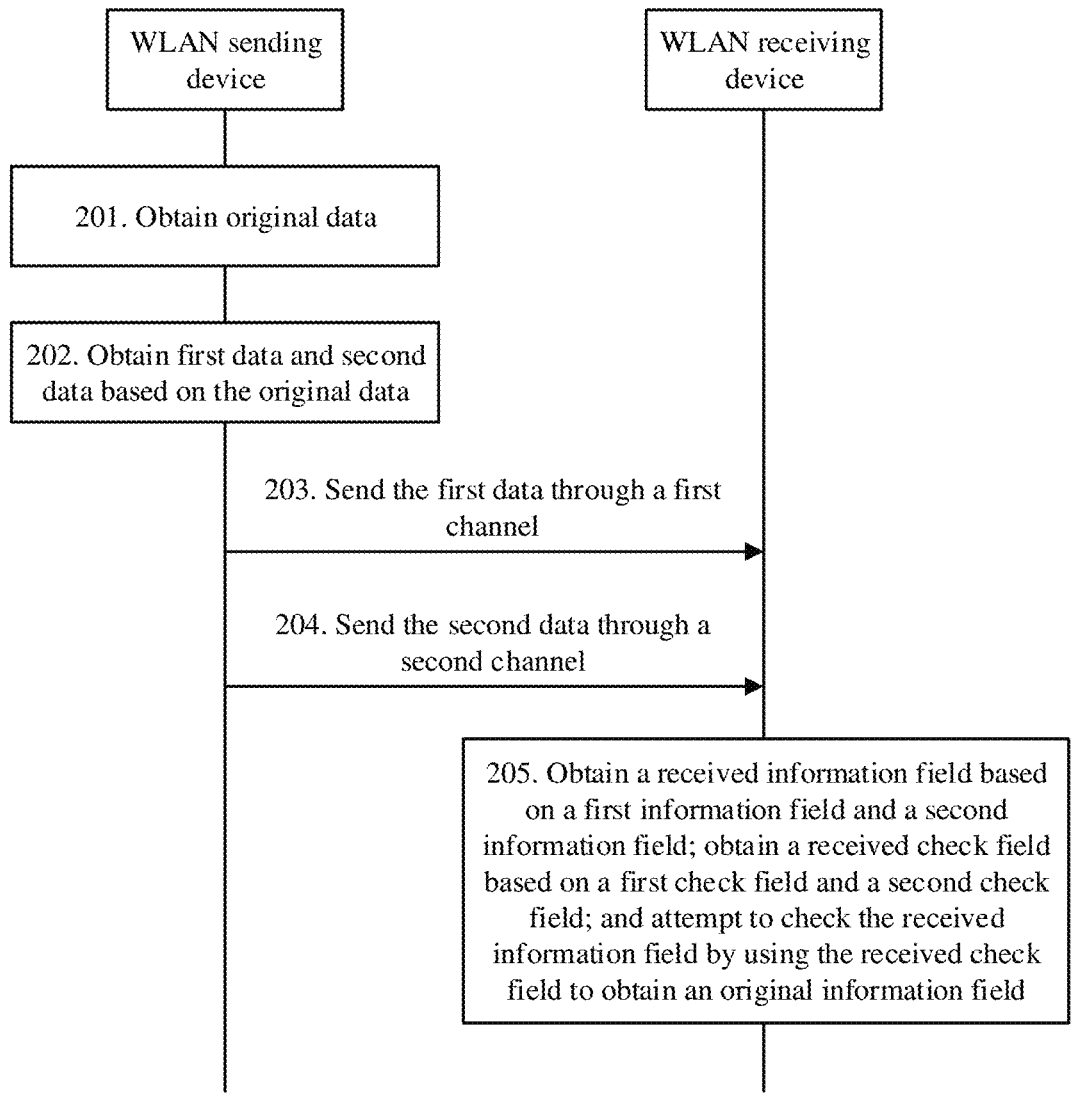
FIG. 2 is a schematic flowchart of a data transmission method according to an embodiment of this application.

Refer to FIG. 2. An embodiment of the data transmission method in embodiments of this application includes the following steps.

201. A WLAN sending device obtains original data.

The WLAN sending device may obtain the original data through channel coding. The original data includes an original information field and an original check field, and the original check field is a result of checking the original information field.

Figure 3:
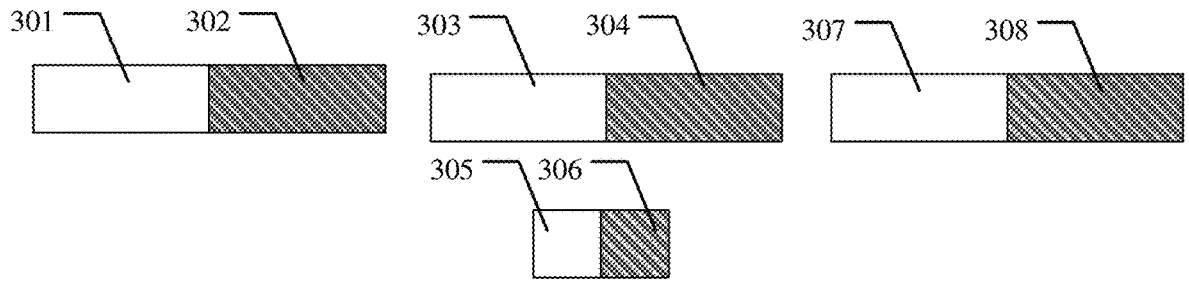
FIG. 3 is a schematic diagram of a data structure according to an embodiment of this application.

An original information field 301 and an original check field 302 in FIG. 3 are used as an example for description. The original data includes two parts: the original information field 301 and the original check field 302. The original check field 302 is a result of checking the original information field 301. A length of the original information field 301 and a length of the original check field 302 may be equal, that is, a bit rate of the original data is equal to ½.

In FIG. 3, the original information field 301 and the original check field 302 of the original data are included, and a first information field 303 and a first check field 304 of first data are included. Content of the first information field 303 is equal to content of the original information field 301, and content of the first check field 304 is equal to content of the original check field 302. A second information field 305 and a second check field 306 of second data are included. A received information field 307 and a received check field 308 are included.

A binary convolutional code (BCC) and a low density parity check code (LDPC code) in a WLAN are used as examples to describe a relationship between the length of the original information field 301 and the length of the original check field 302 in the original data. Both the two coding schemes support transmission at different bit rates, where the bit rate R is defined as a ratio of a length of an original information field to a total of transmission bits. The total of the transmission bits is a sum of the length of the original information field and a length of an original check field. If the length of the original information field is equal to the length of the original check field, the bit rate R is equal to ½. Bit rates supported by the BCC include 1/2, 2/3, and 3/4. Bit rates supported by the LDPC code include 1/2, 2/3, 3/4, and 5/6.

Figure 4:
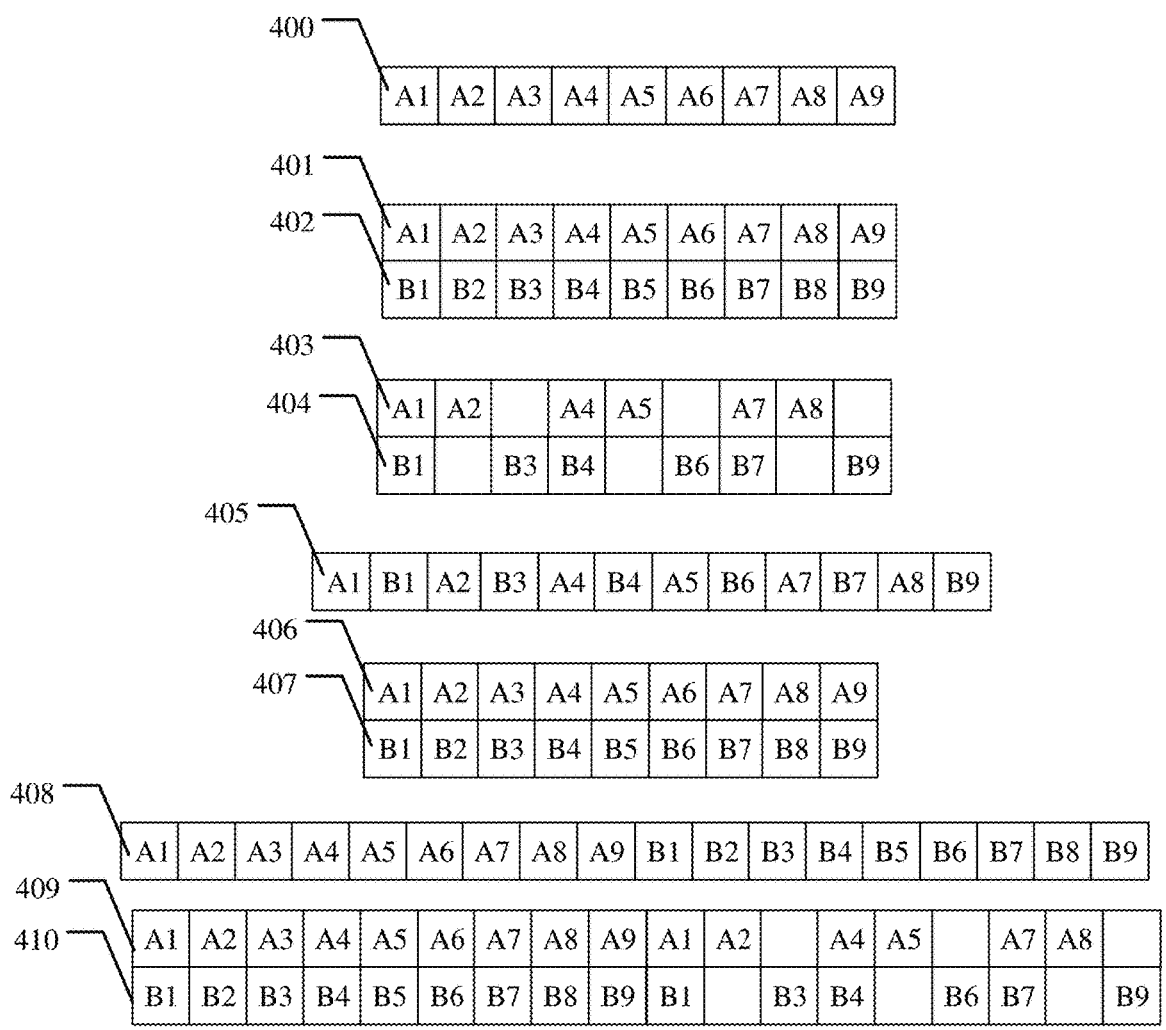
FIG. 4 is a schematic diagram of another data structure according to an embodiment of this application.

FIG. 4 is used as an example to describe how a WLAN receiving device encodes original information to obtain original data, where the original information includes a total of nine bits: A1, A2, A3, A4, A5, A6, A7, A8, and A9. The WLAN sending device encodes the original information and obtains the original data, where the original data includes an original information field 401, and further includes an original check field 402.

202. The WLAN sending device obtains first data and second data based on the original data.

After the WLAN sending device obtains the original data through encoding, the WLAN sending device punctures the original data to obtain the second data, and uses the original data as the first data. The first data includes a first information field and a first check field, and the second data includes a second information field and a second check field.

FIG. 4 is used as an example to describe content that may be carried in each piece of data. FIG. 4 includes original data 400 that includes the original information field 401 and the original check field 402. The original information field 401 includes a total of nine bits: A1, A2, A3, A4, A5, A6, A7, A8, and A9. The WLAN sending device obtains the original check field 402 through encoding, where the original check field 402 includes a total of nine bits: B1, B2, B3, B4, B5, B6, B7, B8, and B9. The WLAN sending device performs puncturing on the original data, and three bits are punctured from the nine bits of the original information field 401, to obtain the second information field 403 of the second data, where the second information field 403 includes six bits: A1, A2, A4, A5, A7, A8. Three bits are punctured from the nine bits of the original check field 402, to obtain the second check field 404 of the second data, where the second check field 404 includes six bits: B1, B3, B4, B6, B7, and B9. The original information field 401 is used as the first information field 406 of the first data, where the first information field 406 also includes a total of nine bits: A1, A2, A3, A4, A5, A6, A7, A8, and A9. The original check field 402 is used as the first check field 407 of the first data, where the first check field 407 also includes a total of nine bits B1, B2, B3, B4, B5, B6, B7, B8, and B9.

Optionally, the WLAN sending device may obtain the first data without performing puncturing, but directly use the original data as the first data, or may obtain the first data by puncturing. In other words, the first information field of the first data may be A1, A2, A4, A5, A7, and A8, and the first check field of the first data may be B1, B3, B4, B6, B7, and B9.

Optionally, the WLAN sending device may obtain the second data by puncturing, or may obtain the second data without performing puncturing, but directly use the original data as the second data. In other words, the second information field of the second data may be A1, A2, A3, A4, A5, A6, A7, A8, and A9, and the second check field of the second data may be B1, B2, B3, B4, B5, B6, B7, B8, and B9.

Optionally, the first check field of the first data is the same as the second check field of the second data. For example, both the first check field and the second check field are B1, B3, B4, B6, B7, and B9.

Optionally, the first information field of the first data is the same as the second information field of the second data. For example, both the first information field and the second information field are A1, A2, A4, A5, A7, A8, and B9.

Optionally, a length ratio of the first check field to the first information field of the first data is equal to a length ratio of the second check field to the second information field of the second data.

203. The WLAN sending device sends the first data to the WLAN receiving device through a first channel.

After the WLAN sending device obtains the first data based on the original data, the WLAN sending device may send the first data to the WLAN receiving device by using a first radio frequency module through the first channel.

The WLAN sending device sends content of the first data to the WLAN receiving device in a specified sequence. For example, a sequence of the first data 408 in FIG. 4 is: A1, A2, A3, A4, A5, A6, A7, A8, A9, B1, B2, B3, B4, B5, B6, B7, B8, B9.

204. The WLAN sending device sends the second data to the WLAN receiving device through a second channel.

After the WLAN sending device obtains the second data based on the original data, the WLAN sending device may send the second data to the WLAN receiving device by using a second radio frequency module through the second channel.

The WLAN sending device sends content of the second data to the WLAN receiving device in a specified sequence.

For example, a sequence of the second data 405 in FIG. 4 is: A1, B1, A2, B3, A4, B4, M, B6, A7, B7, A8, B9.

Optionally, when a transmission rate of the first channel is different from a transmission rate of the second channel, the WLAN sending device may configure data amounts of the first data and the second data, so that when a rate at which the WLAN sending device sends the first data is different from a rate at which the WLAN sending device sends the second data, start time at which the WLAN sending device sends the first data is the same as start time at which the WLAN sending device sends the second data, and end time at which the WLAN sending device sends the first data is the same as end time at which the WLAN sending device sends the second data.

205. The WLAN receiving device obtains a received information field based on the first information field and the second information field. The WLAN receiving device obtains a received check field based on the first check field and the second check field. The WLAN receiving device attempts to check the received information field by using the received check field to obtain the original information field.

After the WLAN receiving device receives the first data and the second data, the WLAN receiving device obtains the received information field based on the first information field and the second information field. The WLAN receiving device obtains the received check field based on the first check field and the second check field. The WLAN receiving device attempts to check the received information field by using the received check field to obtain the original information field. In this embodiment, the WLAN receiving device attempts to check the received information field by using the received check field to obtain the original information field, because in actual application, even if the WLAN receiving device obtains the received information field and the received check field, the WLAN receiving device may fail to obtain the original information field. However, whether the WLAN receiving device can obtain the original information field can be determined only after the WLAN receiving device attempts to check the received information field by using the received check field.

FIG. 4 is used as an example for description. The first information field 406 of the first data includes A1, A2, A3, A4, A5, A6, A7, A8, and A9, and the first check field 407 of the first data includes B1, B2, B3, B4, B5, B6, B7, B8, and B9. The second information field 403 of the second data includes A1, A2, A4, A5, A7, and A8, and the second check field 404 of the second data includes B1, B3, B4, B6, B7, and B9. The WLAN receiving device may obtain a received information field 409 based on the first information field 406 and the second information field 403, where the received information field 409 includes A1, A2, A3, A4, A5, A6, A7, A8, A9, A1, A2, A4, A5, A7, and A8. The WLAN receiving device may obtain a received check field 410 based on the first check field 407 and the second check field 404, where the received check field 410 includes B1, B2, B3, B4, B5, B6, B7, B8, B9, B1, B3, B4, B6, B7, and B9.

Optionally, the WLAN receiving device may remove a repeated part from the received information field 409. The received information field 409 may include only A1, A2, A3, A4, A5, A6, A7, A8, and A9, and does not include the repeated A1, A2, A4, or As.

Optionally, the WLAN receiving device may remove a repeated part from the received check field 410. The received check field 410 may include only B1, B2, B3, B4, B5, B6, B7, B8, and B9, and does not include the repeated B1, B3, B4, B6, B7, or B9.

In actual application, because of interference, a bit error may occur in the received information field 409 and the received check field 410. Therefore, the received information field 409 and the received check field 410 may not include all the bits above. For example, because of the bit error, the received information field may include only A1, A2, A3, A4, A8, and A9, and the received check field may include only B1, B2, B3, B4, B5, B6, and B7.

The WLAN receiving device attempts to check the received information field by using the received check field, to obtain the original information field A1, A2, A3, A4, A5, A6, A7, A8, A9.

Optionally, when the first check field of the first data is the same as the second check field of the second data, after the WLAN receiving device obtains the first data and the second data, the WLAN receiving device may determine whether the first check field of the received first data is the same as the second check field of the received second data. When the WLAN receiving device determines that the first check field is the same as the second check field, the WLAN receiving device uses the first check field or the second check field as the received check field.

Optionally, when the first information field of the first data is the same as the second information field of the second data, after the WLAN receiving device obtains the first data and the second data, the WLAN receiving device may determine whether the first information field of the received first data is the same as the second information field of the received second data. When the WLAN receiving device determines that the first information field is the same as the second information field, the WLAN receiving device uses the first information field or the second information field as the received information field.

Optionally, the WLAN receiving device obtains the original information field by using an equal gain combining algorithm or a maximum ratio combining algorithm.

2. The first data includes the first information field and the first check field, and the second data includes only the second information field or the second check field.

Figure 5:
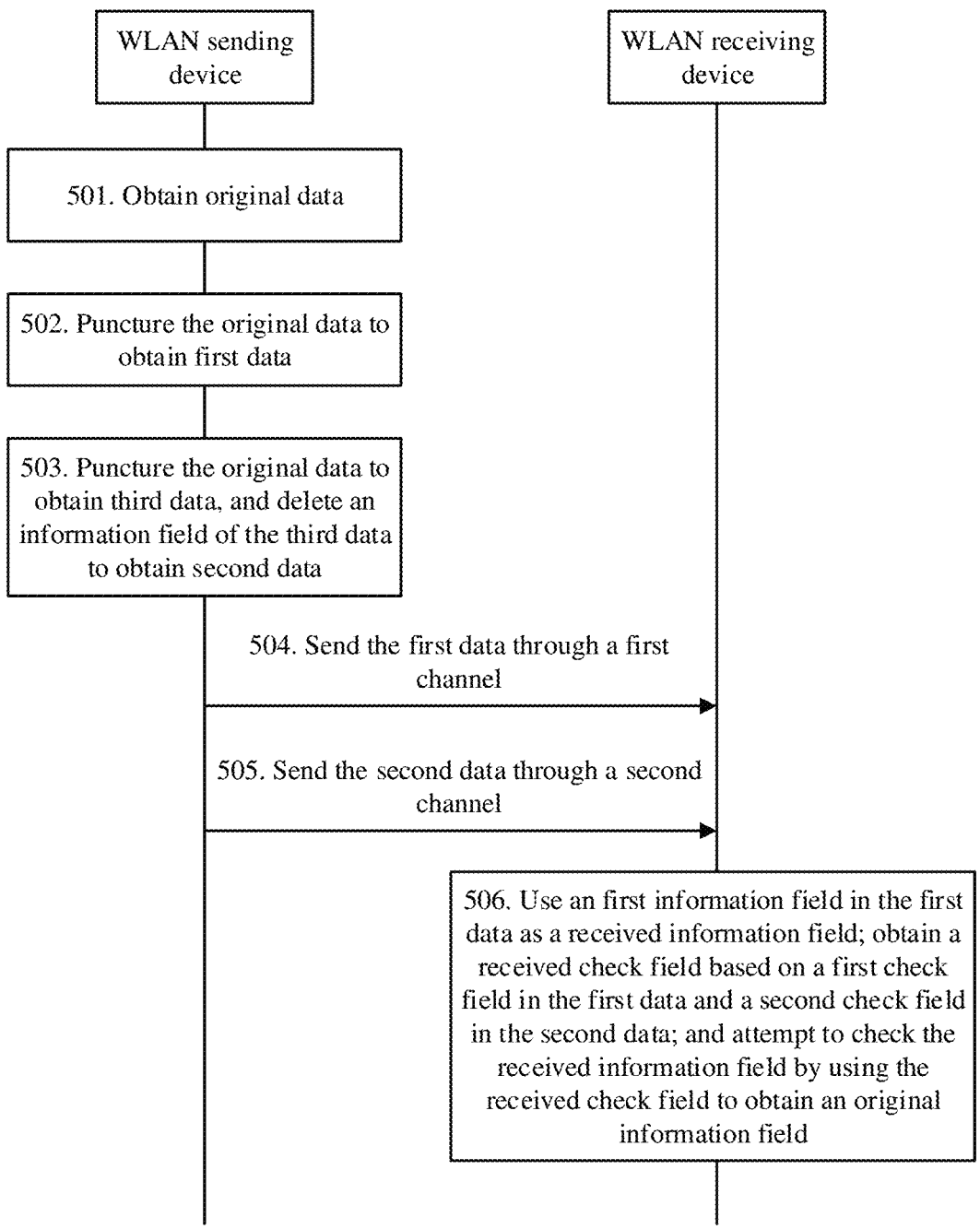
FIG. 5 is a schematic flowchart of a data transmission method according to an embodiment of this application.

Refer to FIG. 5. Another embodiment of the data transmission method in embodiments of this application includes the following steps.

501. A WLAN sending device obtains original data.

Step 501 is similar to Step 201 in FIG. 2, and details are not described herein again.

502. The WLAN sending device punctures the original data to obtain first data.

After the WLAN sending device obtains the original data, the WLAN sending device punctures the original data to obtain the first data.

Figure 6:
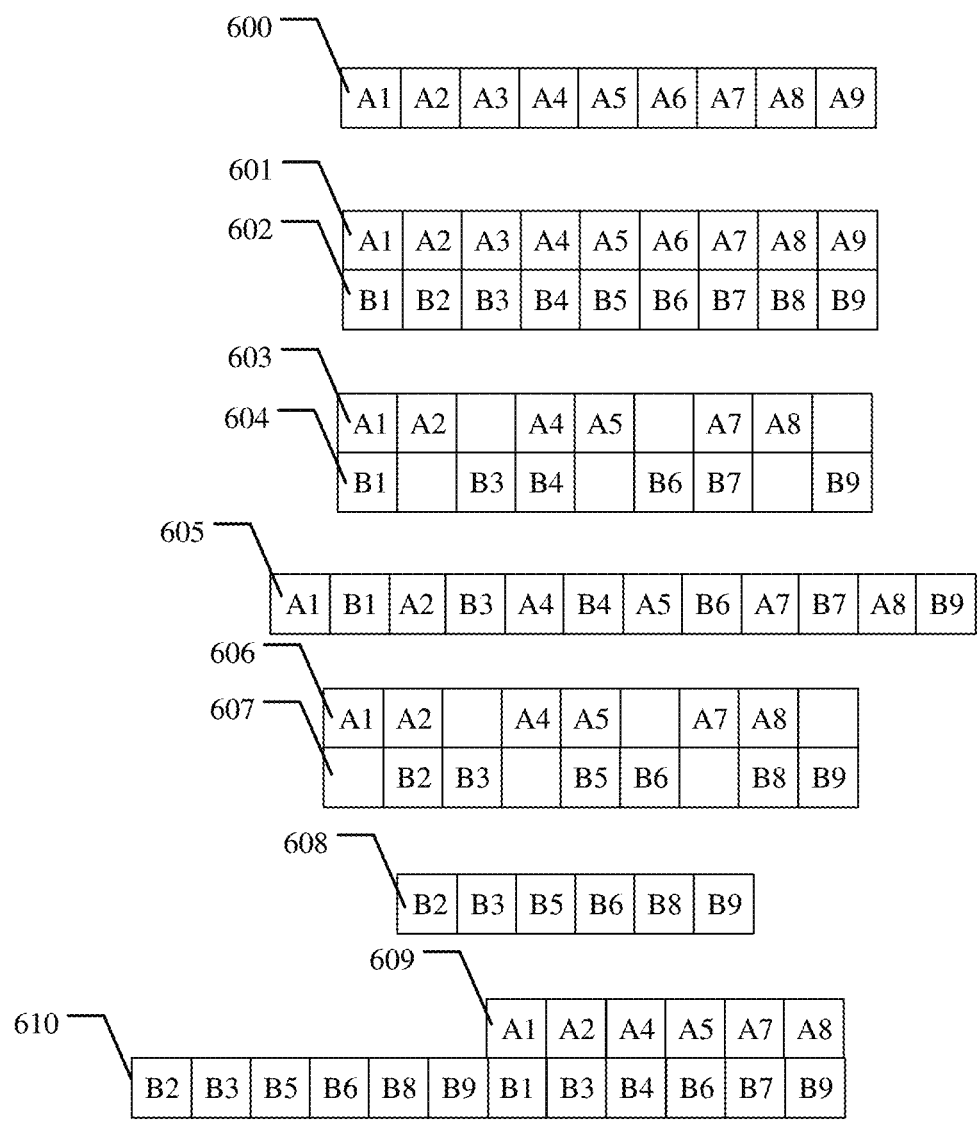
FIG. 6 is a schematic diagram of still another data structure according to an embodiment of this application.

FIG. 6 is used as an example for description. In FIG. 6, original information 600 includes a total of nine bits: A1, A2, A3, A4, A5, A6, A7, A8, and A9. Original data includes an original information field 601 and an original check field 602. The original information field 601 includes a total of nine bits: A1, A2, A3, A4, A5, A6, A7, A8, and A9. The original check field 602 includes a total of nine bits: B1, B2, B3, B4, B5, B6, B7, B8, and B9. The WLAN sending device punctures the original data to obtain first data. The first data includes a first information field 603 and a first check field 604. The first information field 603 includes a total of six bits: A1, A2, A4, A5, A7, and A8. The first check field 604 includes a total of six bits: B1, B3, B4, B6, B7, and B9.

Optionally, the WLAN sending device may obtain the first data without performing puncturing, but directly use the original data as the first data.

503. The WLAN sending device punctures the original data to obtain third data, and deletes an information field of the third data to obtain second data.

The WLAN sending device punctures the original data to obtain the third data, where the third data includes the third information field and a third check field, and the WLAN sending device uses the third check field as the second data.

FIG. 6 is used as an example for description. In FIG. 6, third data includes a third information field 606 and a third check field 607. The third information field 606 includes a total of six bits: A1, A2, A4, A5, A7, and A8. The third check field 607 includes a total of six bits: B2, B3, B5, B6, B8, and B9. A WLAN receiving device uses the third check field 607 as second data 608.

Optionally, the WLAN sending device may obtain the third data without performing puncturing, but directly use the original data as the third data.

Optionally, the WLAN sending device may not delete the information field of the third data, but delete the check field of the third data, and use the third information field of the third data as the second data.

504. The WLAN sending device sends the first data to the WLAN receiving device through a first channel.

After the WLAN sending device obtains the first data based on the original data, the WLAN sending device may send the first data to the WLAN receiving device by using a first radio frequency module through the first channel.

The WLAN sending device sends content of the first data to the WLAN receiving device in a specified sequence. For example, a sequence of the first data 605 in FIG. 6 is: A1, B1, A2, B3, A4, B4, A5, B6, A7, B7, A8, B9.

505. The WLAN sending device sends the second data to the WLAN receiving device through a second channel.

After the WLAN sending device obtains the second data based on the original data, the WLAN sending device may send the second data to the WLAN receiving device by using a second radio frequency module through the second channel.

The WLAN sending device sends content of the second data to the WLAN receiving device in a specified sequence. For example, a sequence of the second data 608 in FIG. 6 is: B2, B3, B5, B6, B8, B9.

Optionally, when a transmission rate of the first channel is different from a transmission rate of the second channel, the WLAN sending device may configure data amounts of the first data and the second data, so that when a rate at which the WLAN sending device sends the first data is different from a rate at which the WLAN sending device sends the second data, start time at which the WLAN sending device sends the first data is the same as start time at which the WLAN sending device sends the second data, and end time at which the WLAN sending device sends the first data is the same as end time at which the WLAN sending device sends the second data.

506. The WLAN receiving device uses the first information field in the first data as a received information field; the WLAN receiving device obtains a received check field based on the first check field in the first data and the second check field in the second data; and the WLAN receiving device attempts to check the received information field by using the received check field to obtain an original information field.

After the WLAN receiving device obtains the first data, the WLAN receiving device uses the first information field of the first data as the received information field. After the WLAN receiving device obtains the second data and the first data, the WLAN receiving device combines the first check field in the first data and the third check field in the second data to obtain the received check field, and attempts to check the received information field by using the received check field to obtain the original information field.

FIG. 6 is used as an example for description. Because the second data carries only the check field and does not carry the information field, the WLAN receiving device may directly use the first information field in the first data as a received information field, where the first information field 603 includes a total of six bits: A1, A2, A4, A5, A7, and A8. Therefore, the received information field 609 may also include a total of six bits: A1, A2, A4, A5, A7, and A8. After obtaining the first data and the second data, the WLAN receiving device may combine the first check field 604 in the first data and the third check field 608 in the second data to obtain a received check field 610, where the received check field 610 includes B1, B3, B4, B6, B7, B9, B2, B3, B5, B6, B8, and B9.

The WLAN receiving device attempts to check the received information field by using the received check field, to obtain the original information field A1, A2, A3, A4, A5, A6, A7, A8, A9.

In actual application, because of interference, a bit error may occur in the received information field 609 and the received check field 610. Therefore, the received information field 609 and the received check field 610 may not include all the bits above. For example, because of the bit error, the received information field may include only A1, A2, A4, and A5, and the received check field may include only B3, B6, B7, B9, B2, B3, B5, B6, B8, and B9.

Optionally, the WLAN receiving device may remove a repeated part from the received check field 610. The received check field 610 may include only B1, B3, B4, B6, B7, B9, B2, B5, and B8, and does not include the repeated B3, B6, or B9.

Optionally, when the WLAN sending device does not delete the information field of the third data, but deletes the check field of the third data, and uses the third information field of the third data as the second data, after the WLAN receiving device obtains the first data, the WLAN receiving device uses the first check field of the first data as the received check field. After the WLAN receiving device obtains the second data and the first data, the WLAN receiving device combines the first information field in the first data and the third information field in the second data to obtain the received information field, and attempts to check the received information field by using the received check field to obtain the original information field.

A time sequence relationship between Step 503 and Step 504 is not limited, and Step 504 may be performed before Step 503.

A time sequence relationship between Step 502 and Step 505 is not limited, and Step 502 may be performed after Step 505.

The data transmission method in embodiments of this application is described above, and the WLAN receiving apparatus in embodiments of this application is described below.

Figure 7:
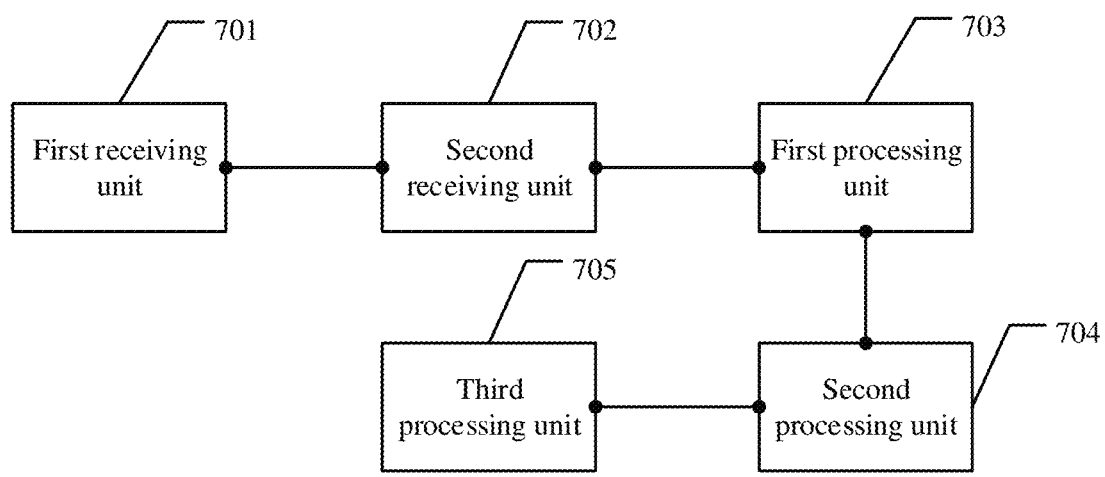
FIG. 7 is a schematic diagram of a structure of a WLAN receiving apparatus according to an embodiment of this application.

Refer to FIG. 7. An embodiment of a WLAN receiving apparatus in an embodiment of this application includes: a first receiving unit 701, configured to receive, by using a first radio frequency module through a first channel, first data that is sent by a WLAN sending device, where the first data is all or a part of original data, the original data includes an original information field and an original check field, the original check field is a result of checking the original information field, and the first channel belongs to a WLAN channel; a second receiving unit 702, configured to receive, by using a second radio frequency module through a second channel, second data that is sent by the WLAN sending device, where the second data is all or a part of the original data, the second channel belongs to the WLAN channel, a frequency of the second channel is different from a frequency of the first channel, the second radio frequency module is different from the first radio frequency module, and content of the second data is different from content of the first data; a first processing unit 703, configured to obtain a received information field based on an information field of the first data and/or an information field of the second data; a second processing unit 704, configured to obtain a received check field based on a check field of the first data and/or a check field of the second data; and a third processing unit 705, configured to attempt to check the received information field by using the received check field to obtain the original information field.

In embodiments of this application, the first channel and the second channel are independent of each other. Therefore, errors that may occur in the data in the two channels are usually irrelevant. However, the data transmitted in the first channel and the second channel is from the same original data. The WLAN receiving apparatus fixes a possible error by using an association between the first data transmitted in the first channel and the second data transmitted in the second channel, which improves data transmission reliability.

Refer to FIG. 7. Another embodiment of a WLAN receiving apparatus in an embodiment of this application includes: a first receiving unit 701, configured to receive, by using a first radio frequency module through a first channel, first data that is sent by a WLAN sending device, where the first data is all or a part of original data, the original data includes an original information field and an original check field, the original check field is a result of checking the original information field, and the first channel belongs to a WLAN channel; a second receiving unit 702, configured to receive, by using a second radio frequency module through a second channel, second data that is sent by the WLAN sending device, where the second data is all or a part of the original data, the second channel belongs to the WLAN channel, a frequency of the second channel is different from a frequency of the first channel, the second radio frequency module is different from the first radio frequency module, and content of the second data is different from content of the first data; a first processing unit 703, configured to obtain a received information field based on an information field of the first data and/or an information field of the second data; a second processing unit 704, configured to obtain a received check field based on a check field of the first data and/or a check field of the second data; and a third processing unit 705, configured to attempt to check the received information field by using the received check field to obtain the original information field.

Optionally, the first data includes a first information field and a first check field. The second data includes a second information field and a second check field. Content of the first check field is the same as content of the second check field.

Optionally, the first data includes a first information field and a first check field. The second data includes a second information field and a second check field. A length ratio of the first information field to the first check field is equal to a length ratio of the second information field to the second check field.

Optionally, the first data includes a first information field and a first check field. The second data includes a second information field and a second check field. Content of the first information field is the same as content of the second information field.

Optionally, the first data includes a first information field and a first check field. The second data includes only a second check field. The received information field is the first information field.

Optionally, the first data includes a first information field and a first check field. The second data includes only a second information field. The received check field is the first check field.

Optionally, the third processing unit 705 is specifically configured to obtain the received information field and the received check field based on the first data and the second data through equal gain combination or maximum ratio combination.

Optionally, the first data includes a first information field and a first check field. The second data includes a second information field and a second check field. Content of the first information field is different from content of the second information field. Content of the first check field is different from content of the second check field. A length ratio of the first information field to the first check field is not equal to a length ratio of the second information field to the second check field.

In this embodiment, operations performed by the units of the WLAN receiving apparatus are similar to those described in the embodiments shown in FIG. 2 and FIG. 5, and details are not described herein again.

Figure 8:
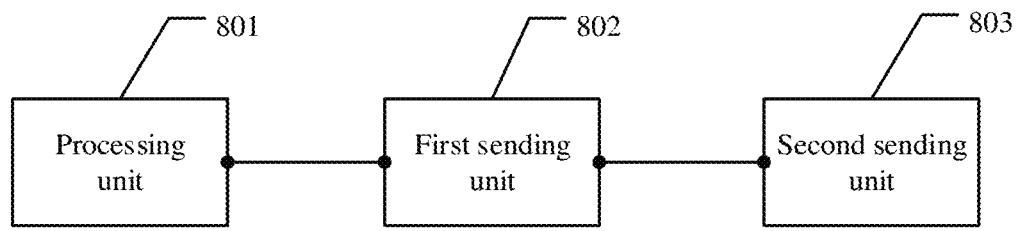
FIG. 8 is a schematic diagram of a structure of a WLAN sending apparatus according to an embodiment of this application.

Refer to FIG. 8. An embodiment of a WLAN sending apparatus in an embodiment of this application includes: a processing unit 801, configured to process original data, so as to obtain first data and second data, where the original data includes an original information field and an original check field, the original check field is a result of checking the original information field, the first data is the original data or a part of the original data, the second data is the original data or a part of the original data, and the first data is different from the second data; a first sending unit 802, configured to send the first data to a WLAN receiving device by using a first radio frequency module through a first channel, where the first channel belongs to a WLAN channel; and a second sending unit 803, configured to send, by using a second radio frequency module through a second channel, the second data to the WLAN receiving device, where the second channel belongs to the WLAN channel, a frequency of the second channel is different from a frequency of the first channel, and the second radio frequency module is different from the first radio frequency module.

In embodiments of this application, the first channel and the second channel are independent of each other. Therefore, errors that may occur in the data in the two channels are usually irrelevant. However, the data transmitted in the first channel and the second channel is from the same original data. The WLAN sending apparatus uses an association between the first data transmitted in the first channel and the second data transmitted in the second channel, to improve data transmission reliability.

Refer to FIG. 8. Another embodiment of a WLAN sending apparatus in an embodiment of this application includes: a processing unit 801, configured to process original data, so as to obtain first data and second data, where the original data includes an original information field and an original check field, the original check field is a result of checking the original information field, the first data is the original data or a part of the original data, the second data is the original data or a part of the original data, and the first data is different from the second data; a first sending unit 802, configured to send the first data to a WLAN receiving device by using a first radio frequency module through a first channel, where the first channel belongs to a WLAN channel; and a second sending unit 803, configured to send, by using a second radio frequency module through a second channel, the second data to the WLAN receiving device, where the second channel belongs to the WLAN channel, a frequency of the second channel is different from a frequency of the first channel, and the second radio frequency module is different from the first radio frequency module.

The WLAN receiving apparatus in this embodiment further includes the following.

Optionally, the first data includes a first information field and a first check field. The second data includes a second information field and a second check field. Content of the first check field is the same as content of the second check field.

Optionally, the first data includes a first information field and a first check field. The second data includes a second information field and a second check field. Content of the first information field is the same as content of the second information field.

Optionally, the first data includes a first information field and a first check field. The second data includes only a second check field.

Optionally, the first data includes a first information field and a first check field. The second data includes only a second information field.

Optionally, the first data includes a first information field and a first check field. The second data includes a second information field and a second check field. A length ratio of the first information field to the first check field is equal to a length ratio of the second information field to the second check field.

Optionally, a rate at which the WLAN sending device sends the first data is different from a rate at which the WLAN sending device sends the second data. Start time at which the WLAN sending device sends the first data is the same as start time at which the WLAN sending device sends the second data. End time at which the WLAN sending device sends the first data is the same as end time at which the WLAN sending device sends the second data.

Optionally, the first data includes a first information field and a first check field. The second data includes a second information field and a second check field. Content of the first information field is different from content of the second information field. Content of the first check field is different from content of the second check field. A length ratio of the first information field to the first check field is not equal to a length ratio of the second information field to the second check field.

In this embodiment, operations performed by the units of the WLAN sending apparatus are similar to those described in the embodiments shown in FIG. 2 and FIG. 5, and details are not described herein again.

Figure 9:
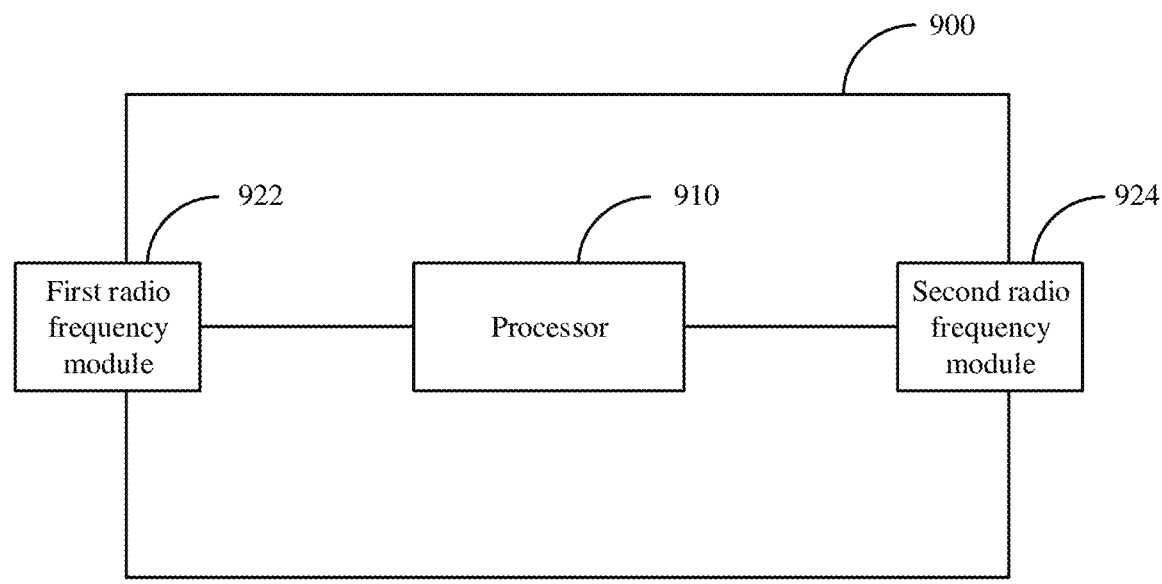
FIG. 9 is a schematic diagram of a structure of a WLAN receiving device according to an embodiment of this application.

Refer to FIG. 9. An embodiment of a WLAN receiving device 900 in an embodiment of this application includes the following.

As shown in FIG. 9, the WLAN receiving device 900 includes a processor 910, and a first radio frequency module 922 and a second radio frequency module 924 that are coupled to the processor 910. The WLAN receiving device 900 may be the WLAN receiving device in FIG. 1, FIG. 2, and FIG. 5. The processor 910 may be an application-specific integrated circuit (ASIC), a digital signal processor (DSP), a chip with another specific processing function, or any combination thereof. The processor 910 may be one processor, or may include a plurality of processors.

The first frequency module 922 is configured to receive, through a first channel, first data that is sent by a WLAN sending device, where the first data is all or a part of original data, the original data includes an original information field and an original check field, the original check field is a result of checking the original information field, and the first channel belongs to a WLAN channel. The second frequency module 924 is configured to receive, through a second channel, second data that is sent by the WLAN sending device, where the second data is all or a part of the original data, the second channel belongs to the WLAN channel, a frequency of the second channel is different from a frequency of the first channel, the second radio frequency module is different from the first radio frequency module, and the second data is different from the first data. The processor 910 is configured to obtain a received information field based on an information field of the first data and/or an information field of the second data. The processor 910 is further configured to obtain a received check field based on a check field of the first data and/or a check field of the second data. The processor 910 is further configured to attempt to check the received information field by using the received check field to obtain the original information field.

In addition, the processor 910 may alternatively be a baseband chip, and the baseband chip performs all operations that can be performed by the processor 910.

In addition, when the WLAN receiving device 900 implements the check function by using software, the WLAN receiving device may further implement, by using the software, all operations that can be performed by the processor 910.

In addition, after executing instructions stored in the processor 910, the processor 910 further performs, according to indications of the instructions, all operations that can be performed by the WLAN receiving device, for example, the operations performed by the WLAN receiving device in the embodiments in FIG. 2 and FIG. 5.

Figure 10:
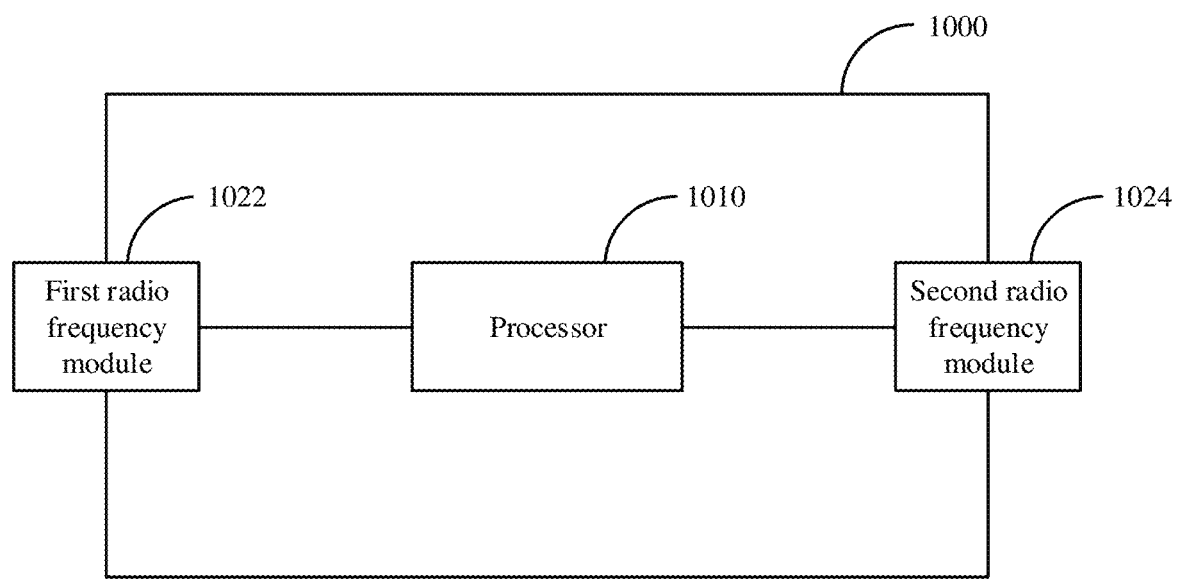
FIG. 10 is a schematic diagram of a structure of a WLAN sending device according to an embodiment of this application.

Refer to FIG. 10. An embodiment of a WLAN sending device 1000 in an embodiment of this application includes the following.

As shown in FIG. 10, the WLAN sending device 1000 includes a processor 1010, and a first radio frequency module 1022 and a second radio frequency module 1024 that are coupled to the processor 1010. The WLAN sending device 1000 may be the WLAN sending device in FIG. 1, FIG. 2, and FIG. 5. The processor 1010 may be an ASIC, a DSP, a chip with another specific processing function, or any combination thereof. The processor 1010 may be one processor, or may include a plurality of processors.

The processor 1010 is configured to process original data, so as to obtain first data and second data, where the original data includes an original information field and an original check field, the original check field is a result of checking the original information field, the first data is the original data or a part of the original data, the second data is the original data or a part of the original data, and the first data is different from the second data.

The first radio frequency module 1022 is configured to send the first data to a WLAN receiving device through a first channel, where the first channel belongs to a WLAN channel.

The second radio frequency module 1024 is configured to send, through a second channel, the second data to the WLAN receiving device, where the second channel belongs to the WLAN channel, a frequency of the second channel is different from a frequency of the first channel, and the second radio frequency module is different from the first radio frequency module.

In addition, the processor 1010 may alternatively be a baseband chip, and the baseband chip performs all operations that can be performed by the processor 1010.

In addition, when the WLAN sending device 1010 obtains the original data by using software, the WLAN sending device 1000 may further implement, by using the software, all operations that can be performed by the processor 1010.

In addition, after executing instructions stored in the processor 1010, the processor low further performs, according to indications of the instructions, all operations that can be performed by the WLAN sending device, for example, the operations performed by the WLAN sending device in the embodiments in FIG. 2 and FIG. 5.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional art, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a flash drive, a removable hard disk, a ROM, a RAM, a magnetic disk, or an optical disc.

What is claimed is:

1. A method, comprising:
receiving, by a wireless local area network (WLAN) receiving device by using a first radio frequency module through a first channel, first data that is sent by a WLAN sending device, wherein the first data is all of or a part of original data, the original data comprises an original information field and an original check field, the original check field carries a result of checking the original information field, and the first channel is a WLAN channel;

receiving, by the WLAN receiving device by using a second radio frequency module through a second channel, second data that is sent by the WLAN sending device, wherein the second data is all of or a part of the original data, the second channel is a WLAN channel, a frequency of the second channel is different from a frequency of the first channel, the second radio frequency module is different from the first radio frequency module, and the second data is different from the first data;

obtaining, by the WLAN receiving device, a received information field based on an information field of the first data or an information field of the second data;

obtaining, by the WLAN receiving device, a received check field based on a check field of the first data or a check field of the second data; and attempting, by the WLAN receiving device, to check the received information field by using the received check field, to obtain the original information field, wherein the first data comprises a first information field and a first check field, the second data comprises only a second check field, and the received information field is the first information field; or the first data comprises a first information field and a first check field, the second data comprises only a second information field, and the received information field is the first check field.

2. The method according to claim 1, wherein when the second data comprises only the second information field, content of the first information field is the same as content of the second information field.

3. The method according to claim 1, wherein the second data comprises only the second check field, content of the first check field is the same as content of the second check field.

4. The method according to claim 1, wherein the first channel and the second channel belong to a same frequency band.

5. The method according to claim 1, wherein the first channel and the second channel belong to different frequency bands.

6. The method according to claim 1, wherein the first data and the second data are received simultaneously.

7. The method according to claim 1, wherein when both the first and second check fields are received, the WLAN receiving device removes repeated parts from the received check field before attempting to check the received information field.

8. A method, comprising:
processing, by a wireless local area network (WLAN) sending device, original data to obtain first data and second data, wherein the original data comprises an original information field and an original check field, the original check field carries a result of checking the original information field, the first data is the original data or a part of the original data, the second data is the original data or a part of the original data, and the first data is different from the second data;

sending, by the WLAN sending device, the first data to a WLAN receiving device by using a first radio frequency module through a first channel, wherein the first channel is a WLAN channel; and sending, by the WLAN sending device by using a second radio frequency module through a second channel, the second data to the WLAN receiving device, wherein the second channel is a WLAN channel, a frequency of the second channel is different from a frequency of the first channel, and the second radio frequency module is different from the first radio frequency module, wherein the first data comprises a first information field and a first check field, the second data comprises only a second check field; or the first data comprises a first information field and a first check field, the second data comprises only a second information field.

9. The method according to claim 8, wherein a rate at which the WLAN sending device sends the first data is different from a rate at which the WLAN sending device sends the second data, a start time at which the WLAN sending device sends the first data is the same as a start time at which the WLAN sending device sends the second data, and an end time at which the WLAN sending device sends the first data is the same as an end time at which the WLAN sending device sends the second data.

10. The method according to claim 8, further comprising obtaining the original data using channel coding.

11. A wireless local area network (WLAN) receiving device, comprising:
a first radio frequency module;
a second radio frequency module; and
a processor, wherein:
the first radio frequency module is configured to receive, through a first channel, first data that is sent by a WLAN sending device, wherein the first data is all of or a part of original data, the original data comprises an original information field and an original check field, the original check field carries a result of checking the original information field, and the first channel is a WLAN channel;

the second radio frequency module is configured to receive, through a second channel, second data that is sent by the WLAN sending device, wherein the second data is all of or a part of the original data, the second channel is a WLAN channel, a frequency of the second channel is different from a frequency of the first channel, the second radio frequency module is different from the first radio frequency module, and the second data is different from the first data; and the processor is configured to:
obtain a received information field based on an information field of the first data or an information field of the second data;
obtain a received check field based on a check field of the first data or a check field of the second data; and
attempt to check the received information field by using the received check field to obtain the original information field, wherein the first data comprises a first information field and a first check field, the second data comprises only a second check field, and the received information field is the first information field; or the first data comprises a first information field and a first check field, the second data comprises only a second information field, and the received information field is the first check field.

12. The WLAN receiving device according to claim 11, wherein the second data comprises only the second information field, content of the first information field is the same as content of the second information field.

13. The WLAN receiving device according to claim 11, wherein the second data comprises only the second check field, content of the first check field is the same as content of the second check field.

14. The WLAN receiving device according to claim 11, wherein the first channel and the second channel belong to a same frequency band.

15. The WLAN receiving device according to claim 11, wherein the first channel and the second channel belong to different frequency bands.

16. A wireless local area network (WLAN) sending device, comprising:
   a first radio frequency module;
   a second radio frequency module; and
   a processor, configured to process original data, to obtain first data and second data, wherein the original data comprises an original information field and an original check field, the original check field is a result of checking the original information field, the first data is the original data or a part of the original data, the second data is the original data or a part of the original data, and the first data is different from the second data;
   the first radio frequency module is configured to send the first data to a WLAN receiving device through a first channel, wherein the first channel belongs to a WLAN channel; and
   the second radio frequency module is configured to send the second data to the WLAN receiving device through a second channel, wherein the second channel belongs to the WLAN channel, a frequency of the second channel is different from a frequency of the first channel, and the second radio frequency module is different from the first radio frequency module,
   wherein the first data comprises a first information field and a first check field, the second data comprises only a second check field; or
   the first data comprises a first information field and a first check field, the second data comprises only a second information field.

17. The WLAN sending device according to claim 16, wherein a rate at which the WLAN sending device sends the first data is different from a rate at which the WLAN sending device sends the second data, a start time at which the WLAN sending device sends the first data is the same as a start time at which the WLAN sending device sends the second data, and an end time at which the WLAN sending device sends the first data is the same as an end time at which the WLAN sending device sends the second data.

18. The WLAN sending device according to claim 16, wherein the processor is configured to obtain the original data using channel coding.

19. The WLAN sending device according to claim 16, wherein the first channel and the second channel belong to a same frequency band.

20. The WLAN sending device according to claim 16, wherein the first channel and the second channel belong to different frequency bands.

* * * * *